Figure 1:
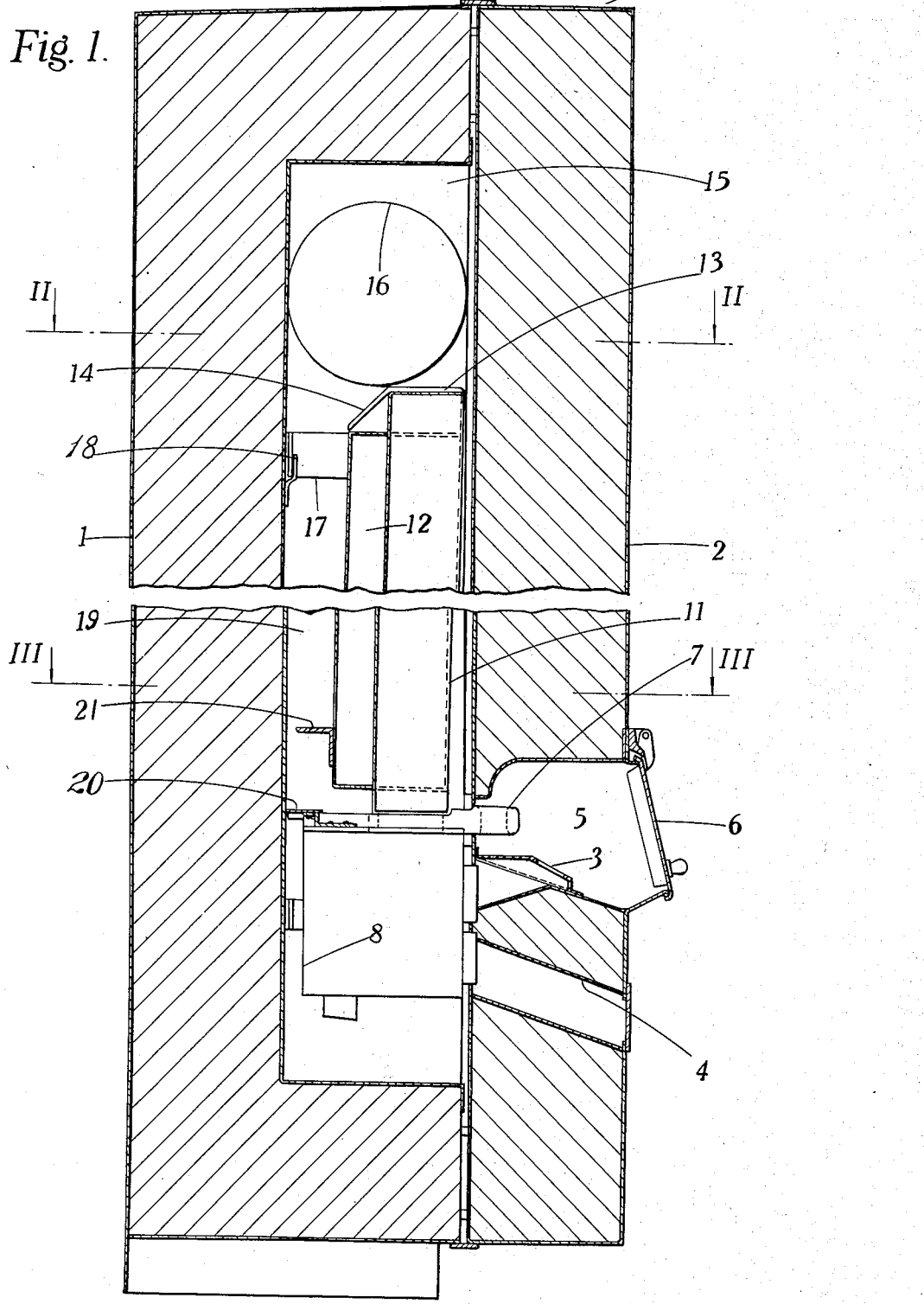

July 20, 1937.　　　　J. W. SMITH　　　　2,087,707
ICE CREAM VENDING MACHINE
Filed April 3, 1936　　　　2 Sheets-Sheet 1

INVENTOR
James W. Smith,
BY Carroll Bailey
ATTORNEY

July 20, 1937.　　　　J. W. SMITH　　　　2,087,707
ICE CREAM VENDING MACHINE
Filed April 3, 1936　　　2 Sheets-Sheet 2

INVENTOR
James W. Smith,
BY Carroll Bailey
ATTORNEY

Patented July 20, 1937

2,087,707

UNITED STATES PATENT OFFICE 2,087,707

ICE CREAM VENDING MACHINE

James Woodrow Smith, Gosforth, Newcastle-on-Tyne, England, assignor to Turner & Newall Limited, Spotland, Rochdale, Lancashire, England, a British company Application April 3, 1936, Serial No. 72,650
In Great Britain December 20, 1935

4 Claims. (Cl. 62—91.5)

The principal difficulty so far encountered in producing a satisfactory coin-freed machine for vending ice cream has been to maintain the lowermost packet or packets of ice cream sufficiently hard, that is to say at the proper temperature. These packets are close to the operating drawer or slide, that is to say they are at a point where there is a considerable tendency for the temperature to rise. The only type of refrigerant that has so far been found satisfactory is a solidified gas which volatilizes within the machine and of which the best example is solidified carbon dioxide, so called dry ice. The rate at which dry ice volatilizes depends upon its superficial area, and, of course, this diminishes as the dry ice volatilizes. In practice it is essential that any machine should keep the ice cream at a proper temperature for a period of at least twenty-four hours, because it is often not feasible to supply fresh dry ice more than once a day. The quantity of dry ice supplied each time the machine is recharged volatilizes initially at a sufficient rate to maintain all the packets of ice cream at a proper temperature, but after a period which depends on the design of the machine, and the amount of dry ice supplied at each recharging, but which may be about fifteen hours, the rate of volatilization falls off so much that the bottom packet or packets of ice cream tend to become too soft. The principal object of the present invention is to provide a very simple method of overcoming the difficulties described above. In the machine according to the present invention a solid refrigerant, such as dry ice, is placed in a compartment such that as the dry ice volatilizes it can move downwards closer to the point where there is most tendency for the temperature to rise. In this way as the rate of volatilization decreases the direct cooling effect of the dry ice is increased at the point where it is most wanted.

The machine incorporates a structure for holding packets of ice cream, and the dry ice may advantageously be placed in a compartment arranged above this structure and having a sloping base. A space may then be left constituting an extension of the dry ice compartment and extending along the said structure and of such dimensions that the dry ice block cannot initially enter it but can slide across the sloping base into it when the block has partly volatilized and is thus diminished in bulk. In such a case the gas volatilized from the dry ice passes downwards into and through the space and in so doing exerts a refrigerating effect upon the back of the ice cream. In order to prevent this refrigerating effect from being too great there should be some kind of a buffer or insulation between the volatilized gas and the ice cream, and this preferably takes the form of a secondary refrigerant contained in a sealed chamber. Advantageously this secondary refrigerant may be a eutectic solution of potassium chloride in water.

Figure 2:
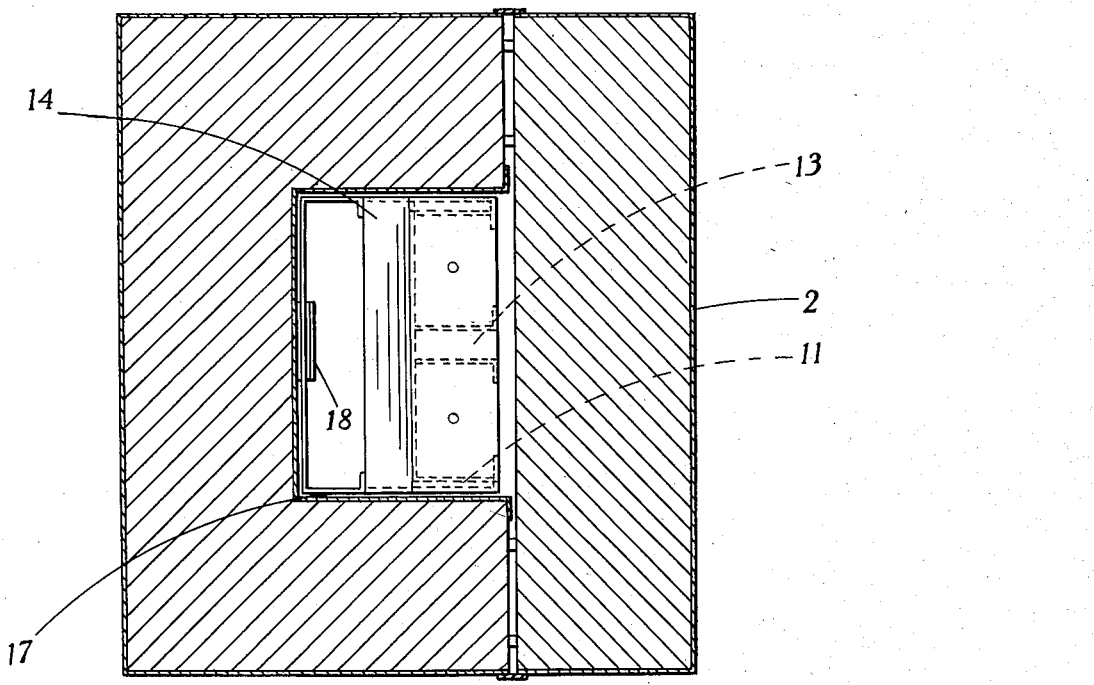
Figure 3:
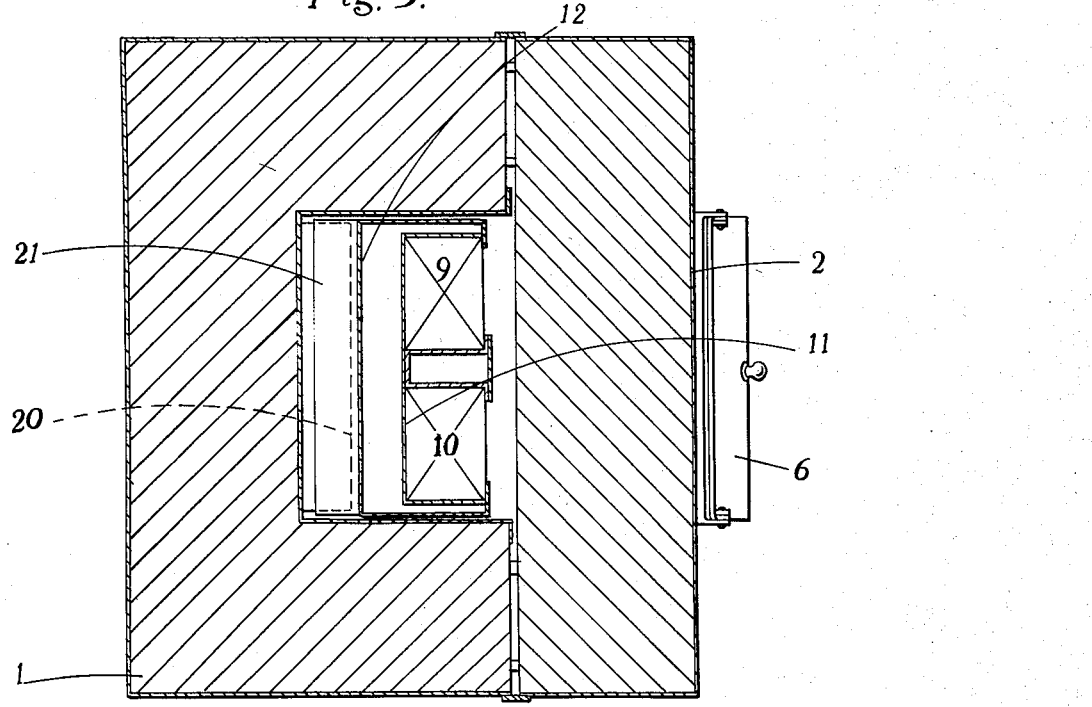

In order that the invention may be clearly understood and readily carried into effect, one machine constructed in accordance therewith will now be described by way of example with reference to the accompanying drawings, in which Figure 1 shows a vertical section through the machine and Figures 2 and 3 are sections on the lines II—II and III—III respectively in Figure 1.

The machine consists of a main insulating casing 1 with an insulating door 2 in which are formed the coin slot 3 and the returned coin chute 4. The coin slot 3 is placed in a space 5 in the door 2 which is closed by an insulating hinged flap 6 and into which two delivery slides 7 deliver packets of ice cream when the vending mechanism is released by a coin inserted through the slot 3. This vending mechanism is shown diagrammatically at 8.

The packets of ice cream are arranged in two columns 9 and 10, within a structure 11. A sealed chamber 12 containing a secondary refrigerant extends along the back and sides of the structure 11. The top of the structure is closed by a plate 13 and another plate 14 runs from the edge of this plate 13 to the inner edge of the top of the chamber 12. This plate 14 constitutes a sloping base to a compartment 15 in which a block of dry ice is inserted.

The structure 11 and chamber 12 are suspended within the casing by a metal loop 17 fixed to the structure and engaging over a bracket 18 fixed to the inner wall of the casing 1. As is clearly shown in Figure 1, the arrangement is such that the whole structure 11 is canted out of the vertical so that the space 19 between the back of the sealed chamber 12 and the inner wall of the casing 1 diminishes in cross-section from top to bottom.

In operation, when a block of dry ice has been inserted in the compartment 15, it volatilizes and the volatilized carbon dioxide gas passes downwards through the space 19 and is diverted by a plate 20 to flow directly across the bottom packets of ice cream in the columns 9 and 10. Thus these bottom packets are cooled more than the remainder. As the block 16 diminishes in bulk it becomes deformed and somewhat elongated so that part of it projects downwards into the space 19. As its bulk diminishes further the block actually descends into this space and gradually slides down it, thus coming closer to the delivery mechanism, which is the point where there is most tendency for the temperature to rise. A plate 21 is fixed to the sealed chamber 12 for the purpose of preventing the dry ice from actually falling on to any of the operating mechanism. It is, of course, clear that the taper may be imparted to the space 19 in other ways, for example, by appropriately shaping the insulation of the casing 1.

Although it is preferred to employ an insulating casing having three insulated sides with the fourth side closed by an insulating door, it is within the invention to employ a casing having two insulating doors on opposite sides and two sets of ice cream compartments arranged back to back, with the space down which the dry ice may move arranged between them. Yet again there may be two or more such sets of ice cream compartments arranged to rotate as a unit within a casing having only one door.

I claim:—

1. In a vending machine, a casing formed with a goods delivery opening, a structure within said casing for holding a column of goods in packet form, walls defining a compartment above said structure for a solidified refrigerant, said compartment having a sloping base, and walls defining a space located behind said structure to constitute an extension of said compartment, said space being dimensioned to prevent a block of solidified refrigerant placed in said compartment from leaving said compartment initially but to allow said refrigerant, as it diminishes in bulk and slides across said sloping base, to enter said space.

2. A vending machine as defined in claim 1, wherein said space diminishes in cross-section from top to bottom, whereby said block can move gradually downwards as it becomes smaller.

3. In a vending machine, an insulating casing, a structure within said casing and adapted to hold at least one column of packets of ice cream, a sealed chamber containing a secondary refrigerant fixed to the back of said structure, walls within said casing defining above said structure a compartment for a block of solidified refrigerant, said compartment having a sloping base, walls defining a space located behind and in part bounded by said sealed chamber, said space communicating with said compartment and being dimensioned to prevent a block of solidified refrigerant placed in said compartment from leaving said compartment initially but to allow said refrigerant, as it diminishes in bulk and slides across said sloping base, to enter said space.

4. A vending machine as defined in claim 3, wherein said space diminishes in cross-section from top to bottom, whereby said block can move gradually downwards as it becomes smaller.

JAMES WOODROW SMITH.